US012596764B1

(12) United States Patent
Agrawal et al.

(10) Patent No.: US 12,596,764 B1
(45) Date of Patent: Apr. 7, 2026

(54) PROMPT CACHING IN GENERATIVE RESPONSE ENGINES

(71) Applicant: OpenAI OpCo, LLC., San Francisco, CA (US)

(72) Inventors: Anushree Agrawal, San Francisco, CA (US); Jeffrey Harris, San Francisco, CA (US); Daryl Neubieser, San Francisco, CA (US); Felipe Petroski Such, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 19/240,708

(22) Filed: Jun. 17, 2025

Related U.S. Application Data

(63) Continuation of application No. 19/077,920, filed on Mar. 12, 2025, now abandoned.

(51) Int. Cl.
| | |
|---|---|
| *G06F 16/957* | (2019.01) |
| *G06F 16/3329* | (2025.01) |
| *G06Q 30/0207* | (2023.01) |
| *G06Q 30/04* | (2012.01) |

(52) U.S. Cl.
CPC .... *G06F 16/9574* (2019.01); *G06F 16/33295* (2025.01); *G06Q 30/0239* (2013.01); *G06Q 30/04* (2013.01)

(58) Field of Classification Search
CPC .......... G06F 16/9574; G06F 16/33295; G06Q 30/0239; G06Q 30/04
See application file for complete search history.

(56) References Cited

U.S. PATENT DOCUMENTS

| | | | |
|---|---|---|---|
| 2023/0117176 A1* | 4/2023 | Ahmadi | G06F 16/2228 |
| | | | 707/600 |
| 2025/0013963 A1* | 1/2025 | Qazvinian | G06Q 10/0639 |
| 2025/0077629 A1* | 3/2025 | Kass | G06F 21/64 |
| 2025/0217576 A1* | 7/2025 | Mann | G06F 16/243 |

OTHER PUBLICATIONS

Toni Witt, "How to Understand, Manage Token-Based Pricing of Generative AI Large Language Models", Jul. 12, 2023, Cloud Wars, pp. 1-7 (Year: 2023).*
Simon Margolis, "Generative AI pricing: 3 major considerations + an AI glossary", Apr. 16, 2024, Sada, pp. 1-16 (Year: 2024).*

* cited by examiner

*Primary Examiner* — Clayton R Williams
(74) *Attorney, Agent, or Firm* — Polsinelli PC

(57) ABSTRACT

Disclosed are systems, apparatuses, processes, and computer-readable media for caching prompts for a generative response engine. The present technology includes receiving, by a cloud computing service, a request including a first prompt including a natural language task to perform, wherein the request include an access key for accessing the cloud computing service; identifying a generative response engine for generating a response to the natural language task based on contents of the natural language task; transmitting the first prompt and a hash to the generative response engine; and receiving the response to the natural language task from the generative response engine, the response including a number of input tokens.

20 Claims, 11 Drawing Sheets

600

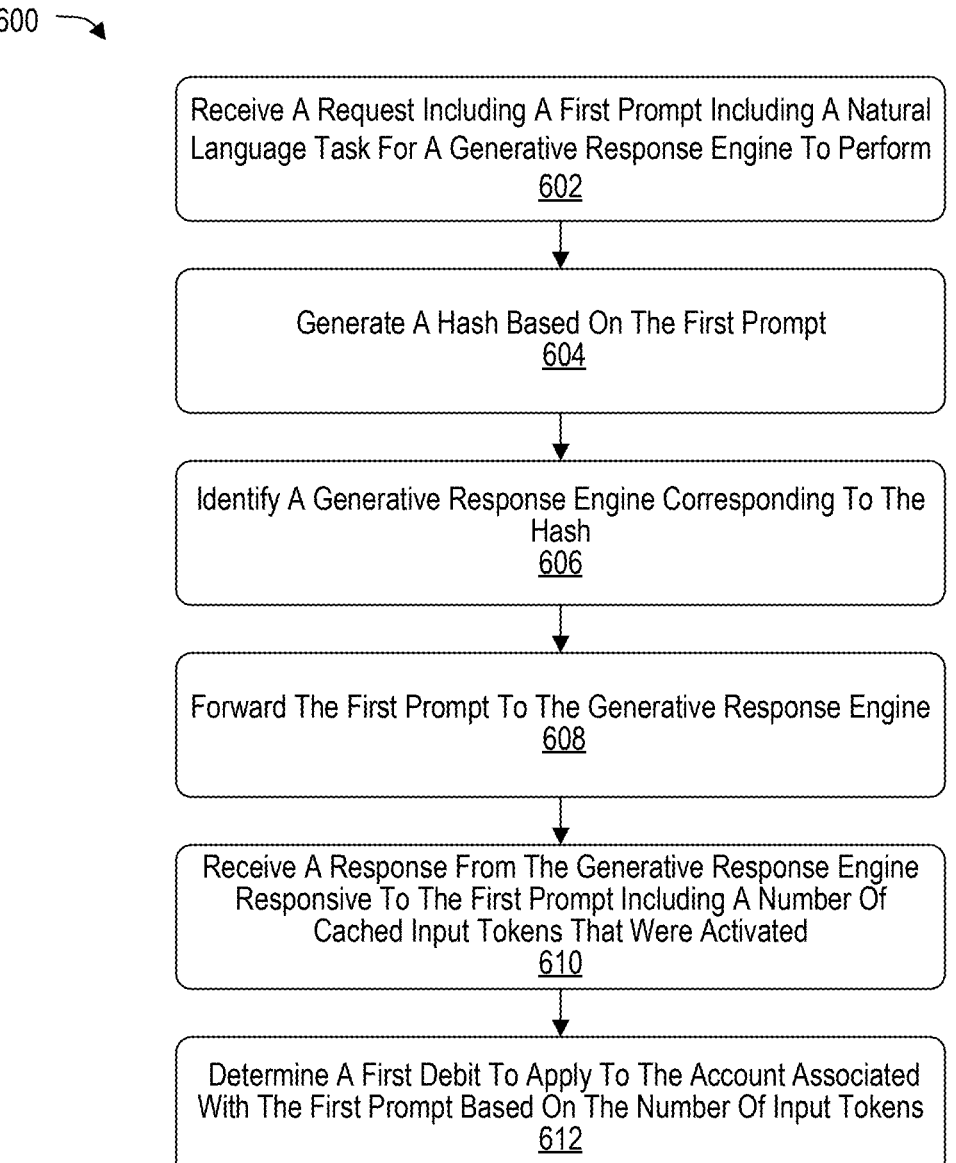

Receive A Request Including A First Prompt Including A Natural Language Task For A Generative Response Engine To Perform
602

Generate A Hash Based On The First Prompt
604

Identify A Generative Response Engine Corresponding To The Hash
606

Forward The First Prompt To The Generative Response Engine
608

Receive A Response From The Generative Response Engine Responsive To The First Prompt Including A Number Of Cached Input Tokens That Were Activated
610

Determine A First Debit To Apply To The Account Associated With The First Prompt Based On The Number Of Input Tokens
612

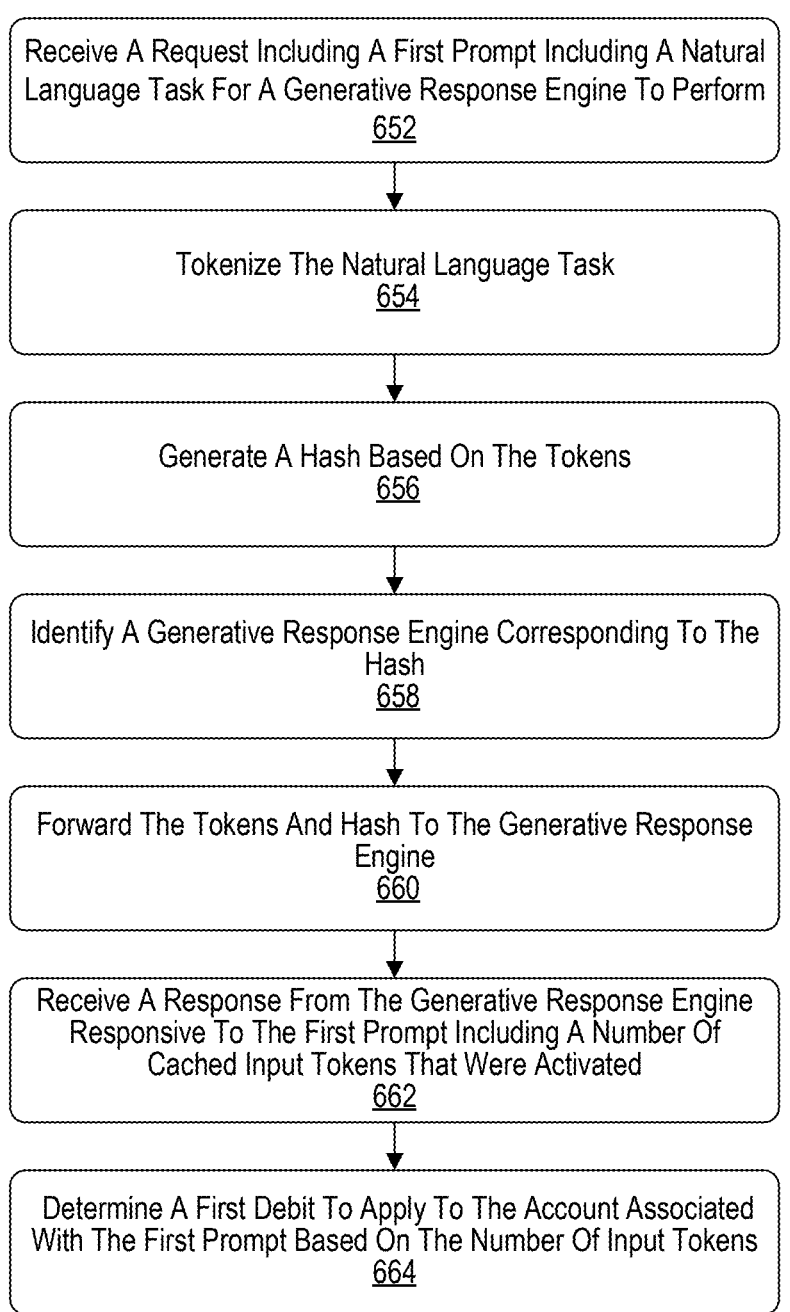

Receive A Request Including A First Prompt Including A Natural Language Task For A Generative Response Engine To Perform
652

Tokenize The Natural Language Task
654

Generate A Hash Based On The Tokens
656

Identify A Generative Response Engine Corresponding To The Hash
658

Forward The Tokens And Hash To The Generative Response Engine
660

Receive A Response From The Generative Response Engine Responsive To The First Prompt Including A Number Of Cached Input Tokens That Were Activated
662

Determine A First Debit To Apply To The Account Associated With The First Prompt Based On The Number Of Input Tokens
664

FIG. 6B

ENCODE BLOCK <u>810</u>

DECODE BLOCK <u>814</u>

PROMPT CACHING IN GENERATIVE RESPONSE ENGINES

CROSS-REFERENCE TO RELATED APPLICATIONS

This application is a continuation of and claims priority to U.S. application Ser. No. 19/077,920, filed on Mar. 12, 2025, entitled PROMPT CACHING IN GENERATIVE RESPONSE ENGINES, which is expressly incorporated by reference herein in its entirety.

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 6A is a flow diagram of a process for caching input prompts with a generative response engine in accordance with some aspects of the disclosure;

FIG. 6B is a flow diagram of a process for caching input prompts with a generative response engine in accordance with some aspects of the disclosure;

DESCRIPTION

Figure 1:
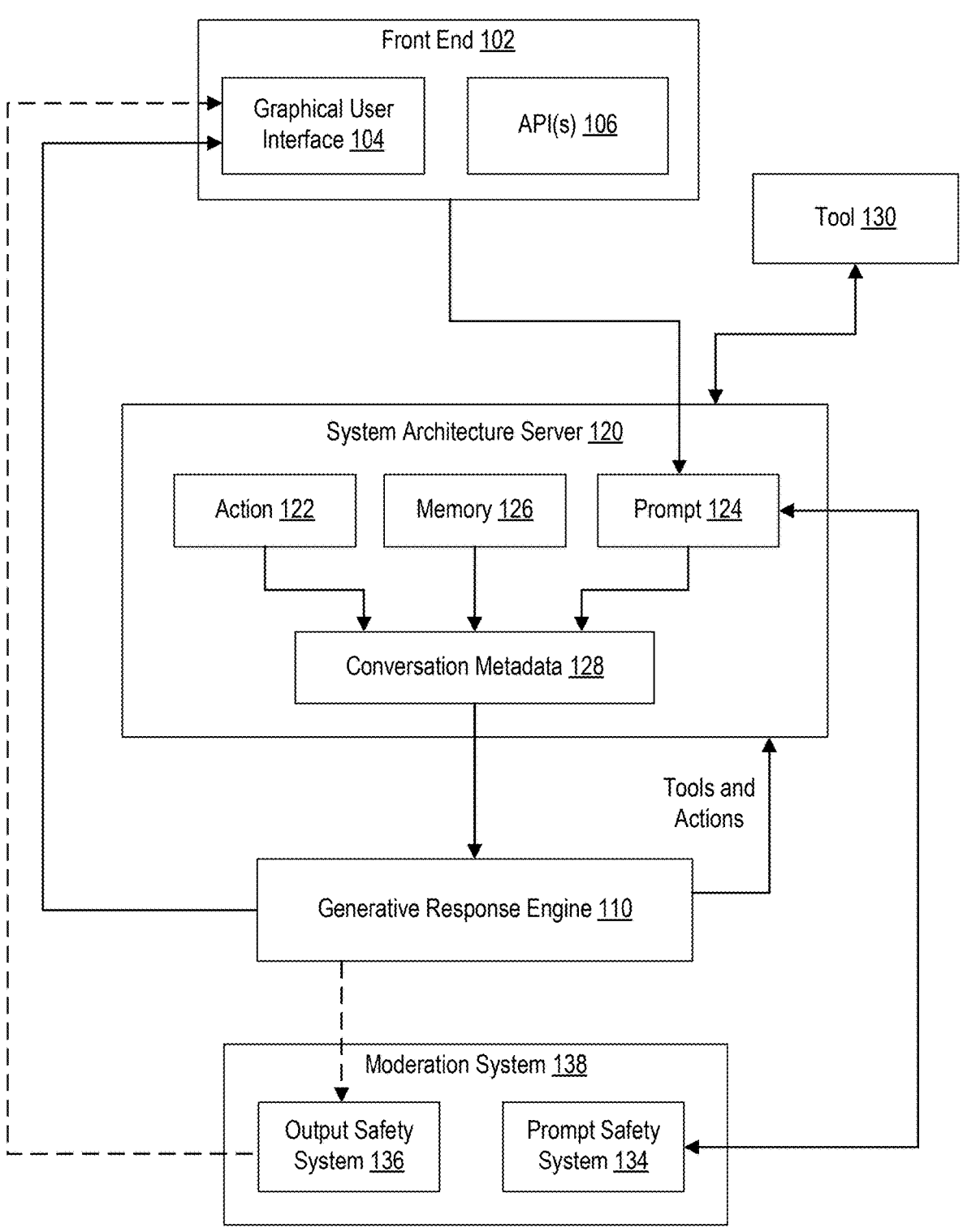
FIG. 1 illustrates an example system supporting a generative response engine during inference operations in accordance with some embodiments of the present technology.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. However, despite their remarkable linguistic prowess, these generative response engines operate on a foundation of publicly available information and do not possess personal information about individual users.

In some aspects, a cloud computing services allow customers to offload computations and other functions that require specialized configurations. For example, a generative response engine requires specialized compute units for parallel floating point and vector computations. Cloud computing services can include different front ends to access a generative response engine by end users to process input queries and generate detailed, context-aware responses. These capabilities are valuable for diverse use cases and may include capabilities to enhance existing business services for customers. For example, generative response engines may be used for customer support, code generation, analyzing large volumes of data such as during discovery processes in litigation, security functions, and so forth. Cloud computing services may include an application programming interface (API) to enable machine-to-machine communication to enable customers to seamlessly extend operations to use a generative response engine without having to build specialized infrastructure, corresponding machine learning models, and other infrastructure.

In some cases, a customer may reuse an input prompt for common functionality. For example, an input prompt can be reused to build a standardized summary of documents, summaries of audio (e.g., from a customer support call), summaries of images (e.g., from a security camera). In these cases, generative response engine efficiency can be improved by caching the input tokens so that related queries can reactivate the input tokens from earlier queries.

Generative response engine instances may be executed at hardware nodes in datacenters and API requests are randomly assigned to different hardware node associated with a generative response engine. A generative response engine may be implemented, at least in part, by a hardware node that includes processing components for floating point and vector-based operations of a transformer model. For example, the server executing the generative response engine may include a plurality of multiply-accumulate (MAC) units that are optimized for matrix operations, such as convolution and matrix multiplication. A generative response engine receives input data and performs matrix transformations and nonlinear activation functions to break down and parallelize matrix operations. The generative response engine is configured to perform tasks such as inference (e.g., runtime operation of an ML model) or training of deep learning models. The hardware node that executes the generative response engine can also be referred to as a neural engine, a neural processing unit, and so forth.

The transformer is a machine learning model, which is further described in detail below, that is configured to process sequential data using multi-head self-attention mechanisms and feedforward neural networks. A transformer includes different activation layers that introduce non-linearity and allow the transformer to learn complex relationships in data and, in particular, the tokens that are most likely to affect other downstream (or upstream) tokens. During inference, each token in a sequence passes through multiple layers, with each step requiring computations for attention scores and activations.

Processing every token from scratch, especially for long sequences, is computationally expensive and time-intensive. Caching becomes essential in this context as it allows the model to store intermediate outputs, such as attention key-value pairs, from previously processed tokens. By reusing these cached values, the model avoids redundant calculations, significantly speeding up inference and reducing resource utilization, particularly in tasks like text generation where context needs to be preserved across tokens.

Caching tokens in a generative response engine that is backed by many different transformer engines across multiple datacenters that are geographically dispersed is a complex process because the same hardware needs to be reactivated. A front end of a generative response engine is configured to randomly assign tasks to different transformer engines because cached tokens cannot be shared; a strategy should be implemented at the front end to ensure that similar prompts are directed to the same transformer engine to reuse the token cache.

In some aspects, a generative response engine is configured to accept multimodal inputs and can be trained to understand visual changes and could potentially implement a computer agent, which is an autonomous software program designed to perform tasks, make decisions, or provide insights on behalf of a user. Computer agents can analyze vast amounts of data, automate repetitive actions, and respond intelligently to specific triggers. For instance, a person might use a computer agent to monitor stock prices and execute trades, schedule and manage appointments, or sift through extensive datasets to find trends or anomalies. Computer agents can act on behalf of a person to perform tasks to save time, enhance efficiency, and reduce the cognitive burden of managing complex or mundane tasks.

However, deploying computer agents can pose privacy concerns, especially when they handle sensitive data such as financial transactions, personal communications, or proprietary business information. Running the agent in a remote environment (e.g., a secure cloud server) can mitigate these risks by centralizing data access within a controlled, monitored, and encrypted system. The remote environment reduces the potential for data breaches on local devices, ensures compliance with security best practices, and balances functionality and privacy. Both user and machine control inputs are important with computer agents to ensure they operate within defined parameters, align with the user instructions, and adapt to dynamic environments or specific requirements.

FIG. 1 illustrates an example system supporting a generative response engine during inference operations in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from a human or a software entity (AI or applications). The prompt is generally in natural language but could be in code, including binary.

Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., a generative pre-trained transformer) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses graphical user interface 104 and Application Programming Interfaces (APIs) 106 that facilitate communication, input processing, and output presentation. Generally, users interact through a graphical user interface 104 that often includes a conversational interface, and applications interact through API 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some embodiments, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. But even when a model doesn't directly accept certain types of inputs, the front end 102 might be able to receive different types of inputs, which can be converted to inputs that are accepted by the generative response engine 110. For example, a language model is generally configured to accept text, but the front end 102 can accept voice and convert it to text or accept an image and create a textual representation.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. For example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the front end 102 might have access to a memory 126 where facts about the user account have been stored. In some embodiments, these facts can have been identified as facts worth storing by the generative response engine and the front end 102 has stored these facts at the direction of the generative response engine. Accordingly, these facts can be provided to the generative response engine 110 along with a user-provided prompt so that the generative response engine has access to these facts when generating a response.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints.

The graphical user interface 104 is also configured to display the responses from the generative response engine, which might include text, code snippets, images, or interactive elements.

In some embodiments, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document. In some embodiments, the generative response engine 110 can provide instructions to the front end 102 to record facts in a personalization notepad. Accordingly, the graphical user interface 104 does not always display all of the output of the generative response engine.

As noted above, the front end 102 can also provide one or more application programming interfaces (API(s)) 106. APIs enable developers to integrate the generative response engine's capabilities into external applications and services. They provide programmatic access to the generative response engine, allowing for customized interactions and functionalities.

The APIs 106 can accept structured requests containing prompts, context, and configuration parameters. For example, an API can be used to provide prompts and divide the prompt into system prompts and user prompts. In some embodiments, the APIs 106 can provide specific inputs for which the generative response engine 110 is configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the generative response engine's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might require utilizing other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a system architecture server 120. The function of system architecture server 120 is to manage and organize the flow of data among key subsystems, enabling the generative response engine 110 to generate responses that are contextually relevant, accurate, and enriched with additional information as required.

Action 122 facilitates auxiliary tasks that extend beyond basic text generation. In some embodiments, action 122 can be actions that correspond to an API 106. In some embodiments, action 122 can be agentic actions that the generative response engine 110 decides to take to carry out a user's intent as described in the prompt.

Prompt 124 is the request or command provided by the user account through front end 102. In some embodiments, prompt 124 can be further supplemented by a system prompt and other information that might be included by graphical user interface 104 or API 106. In some embodiments, prompt 124 can even be modified or enhanced by generative response engine 110 as addressed further below. Additionally, as the user account provides prompts and generative response engine 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by generative response engine 110 can include a thread of user-provided messages and responses from generative response engine 110 in a multi-turn conversation. Generally, prompt 124 will include an entire conversation thread, but in some instances, prompt 124 might need to be shortened if it exceeds a maximum accepted length (generally measured by a number of tokens).

System architecture server 120 can also route prompts and response through moderation system 138, which can be separate or part of system architecture server 120. In some embodiments, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some embodiments, prompt safety system 134 can utilize text pattern matching, classifiers, and/or other AI techniques.

Since prompts can evolve over time through the course of a conversation, consisting of prompts and responses, prompts can be repeatedly evaluated at each turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some embodiments, memory can be recorded at the instruction of generative response engine 110 when generative response engine 110 identifies a fact or data that it determines should be saved in memory because it might be useful in later conversations or sessions.

Conversation metadata 128 can aggregate data points relevant to the conversation, including user prompt 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from system architecture server 120) and generates outputs. In some embodiments, the generative response engine is a Generative Pre-trained Transformer (GPT), but it could utilize other architectures.

A core feature of generative response engine 110 is to generate content in response to prompts. When the generative response engine 110 is a GPT, it is configured to receive inputs from front end 102 that provide guidance on a desired output. The generative response engine can analyze the input and identify relevant patterns and associations in the data, and it has learned to generate a sequence of tokens that are predicted as the most likely continuation of the input. The generative response engine 110 generates responses by sampling from the probability distribution of possible tokens, guided by the patterns observed during its training. In some embodiments, the generative response engine 110 can generate multiple possible responses before presenting the final one. The generative response engine 110 can generate multiple responses based on the input, and these responses are variations that the generative response engine 110 considers potentially relevant and coherent.

In some embodiments, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some embodiments, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some embodiments, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it needs to interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it needs to plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user.

In some embodiments, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some embodiments, the responses might be returned by way of system architecture server 120.

Figure 2:
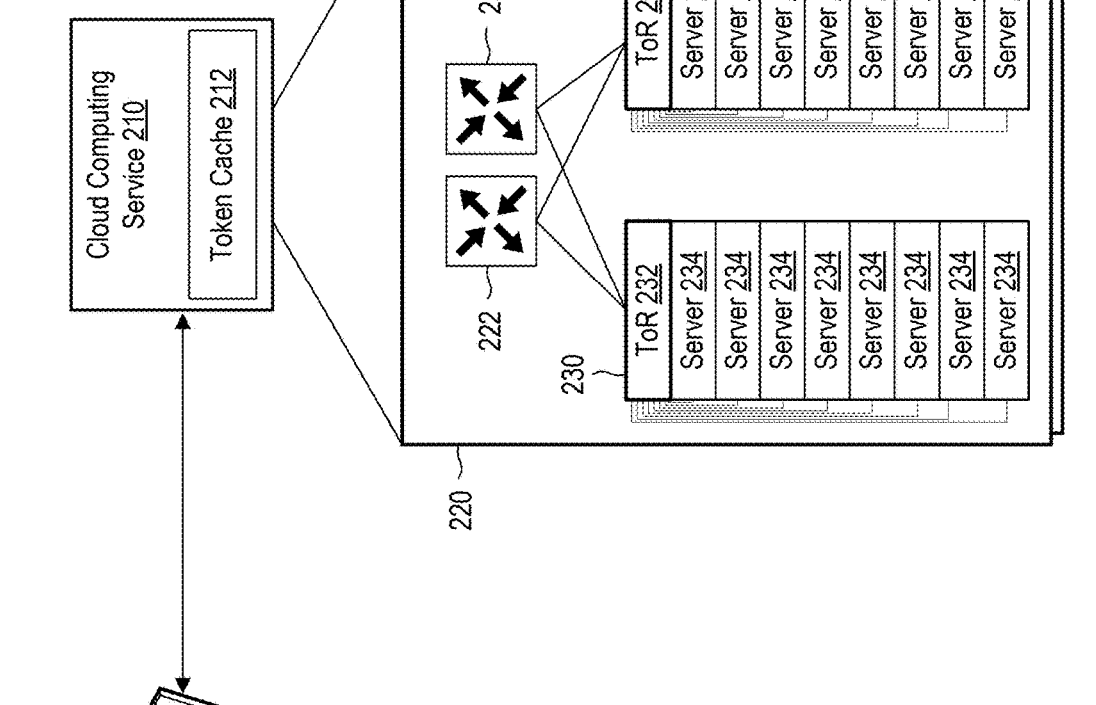
FIG. 2 is a conceptual diagram illustrating a client interacting with a generative response engine in accordance with some aspects of the disclosure.

FIG. 2 is a conceptual diagram 200 illustrating a client 202 interacting with a cloud computing service 210 that includes different types of compute and ML services (e.g., generative response engine 110 in FIG. 1, embedding engines, etc.) in accordance with some aspects of the disclosure.

In some aspects, client 202 is configured to send a request (e.g., an HTTP request) including a prompt for ML 210 to generate a corresponding response using a generative response engine. The prompt may include a natural language task, which is a human-understandable content. The cloud computing service 210 is configured to process and analyze the natural language task and to perform specific functions such as understanding, generating, translating, or extracting information from text, audio, or images.

The cloud computing service 210 includes a plurality of data centers 220 that are geographically distributed to ensure redundancy, improve reliability, reduce latency, enhance disaster recovery, and distribute workloads efficiently across different geographic regions. For example, the data centers 220 can execute instances of a generative response engine (e.g., the generative response engine 110 in FIG. 1). A data center 220 includes high-performance computing, storage, and networking needs while ensuring scalability and reliability. The data center includes networking devices (e.g., routers, switches, load balancers) that are cross-coupled between different racks 230 of network nodes to provide additional layers of redundancy. Each rack may include a top-of-rack (ToR) switch 232 for routing network data and other information to servers 234 installed in that rack 230. In some aspects, a server can be configured as a generative response engine and may include MAC units for handling floating point and vector math operations associated with a generative response engine. Each server 234 may also include a cache, such as a token cache, associated with a previous computation associated with a layer of a transformer model.

The service 210 may select a corresponding server 234 for a prompt based on hashing a portion of an input prompt. For example, cloud computing service 210 may hash the first 512 input characters to generate an identifier based on a computation that distributes a prompt to a corresponding data center 220 and corresponding server 234 in that data center. In some aspects, data center 220 may be selected based on aspects of the input query, such as if the query requests a deferred response (e.g., within 24 hours) in exchange for a lower cost.

In some aspects, cloud computing service 210 may include token cache 212 that is configured on a per-user basis and caches previous inputs into service 210. In some aspects, the token cache may be a key-value pair with the key corresponding to an input prompt and the value corresponding to an identification of server 234. In some cases, the identification of the server may explicitly or implicitly include information to allow cloud computing service 210 to provide a prompt having the same input tokens to the same server 234 to prevent duplicated tokenization of the prompt. For example, if the prompt includes 2048 input tokens that are identical to a previous prompt, server 234 can reduce tokenization operations and may reduce power consumption by server 234 by using activated tokens by an ML model instead of processing the tokens again. In addition, the reduction in power consumption by server 234 also benefits other power consumption in auxiliary systems (e.g., climate control, etc.).

Figure 3:
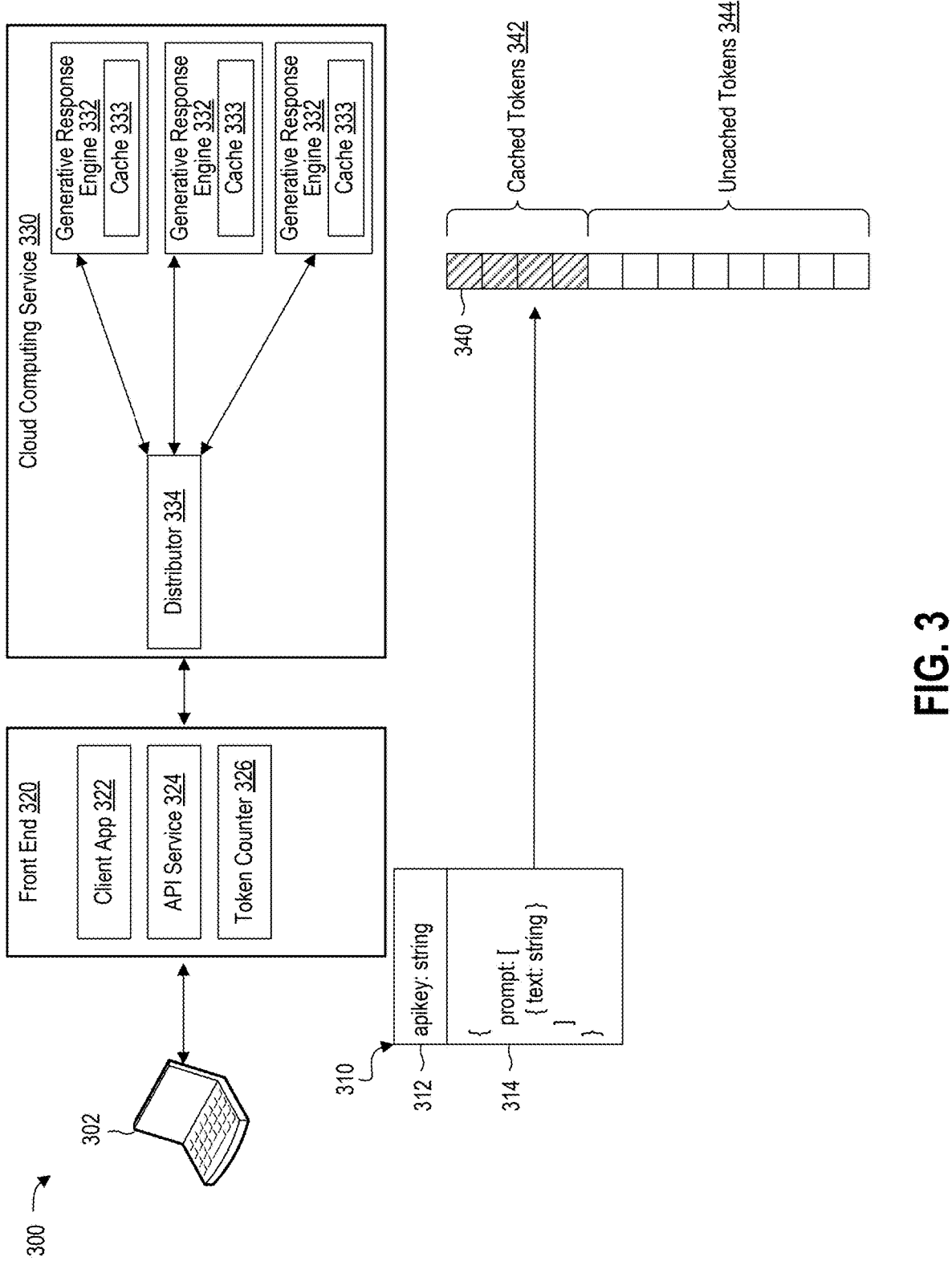
FIG. 3 is a conceptual diagram illustrating caching of input tokens in accordance with some aspects of the disclosure.

FIG. 3 is a conceptual diagram 300 illustrating caching of input tokens in accordance with some aspects of the disclosure. In some aspects, client 302 (e.g., client 302) sends a request, such as an HTTP request 310. A front end 320 (e.g., front end 102 in FIG. 1) is configured to receive HTTP request 310 and interface with a cloud computing service 330 for offloading various compute services. For example, the cloud computing service 330 may include generative response engines for generating natural language responses and front end 320 selects a corresponding generative response engine 332 (e.g., corresponding to a server 234 in FIG. 2) based on a prompt in HTTP request 310.

In some aspects, HTTP request 310 includes a header 312 and a body 314. The header 312 may be configured to include an API key that provides authentication credentials to front end 320 to apply costs to an account corresponding to the API key. An API key is typically placed in header 312 rather than body 314 because headers are designed to carry metadata and authentication information that applies to the entire HTTP request, making them the standard location for API keys. The separation of header and body ensures that the key is easily accessible and consistently handled by HTTP clients and middleware, which often have built-in mechanisms for processing headers.

In some aspects, front end 320 includes a client application 322 or an API server that can interface with the client 302. For example, the client application 322 can use various rendering and hydration techniques such as client-side rendering, server-side rendering, static site generation, etc. The API server (e.g., Express, Deno, Bun, etc.) is configured to interface with various types of requests and may be used by the client application 322 or an application local to the client 302 to interface with the cloud computing service 330.

Body 314 includes a type for a prompt that is an array of data that includes primitive values that form a query. A primitive value is an immutable data type provided by a programming language and includes values that represent a single piece of data (e.g., number, string, Boolean, etc.) rather than a complex object or reference. The array of data in this case includes a single text string in the array. However, body 314 can include different types of data, such as text, images, and audio that can be provided to cloud computing service 330.

In some aspects, cloud computing service 330 may include distributor 334 that is configured to distribute prompts to a corresponding generative response engine 332 using a deterministic process. A deterministic process is a system or computation that, given a specific input, always produces the same output without any randomness or variation. In one aspect, distributor 334 generates a hash using a prefix of a prompt in HTTP request 310 and a distinct key, such as an API key, a user identifier, a user generated secret, or a random value associated with a user session. For example, distributor 334 may compute a hash based on the characters of the prompt (e.g., the text in the prompt) combined (e.g., concatenated) with a user identifier to generate a deterministic user-specific hash based on the prefix of the prompt. In some aspects, distributor 334 maps the generated hashes to a particular generative response engine or a group of generative response engines (e.g., generative response engines associated with a ToR switch 232) that may cache the activated tokens. In this way, different generative response engines 332 are activated in a pseudo-random manner and distribute the prompts equally.

In some cases, the generative response engine identification process associated with the distributor 334 can be handled with different techniques. For example, the front end 320 may store a key-value pair that identifies a prompt and an identifier associated with the generative response engine based on that prompt. For example, distributor 334 may defer the hashing calculation until prompt cache 336 is checked for previous prompts that are cached in generative response engine. A non-limiting example of key-value pair store is illustrated in Table 1 and maps an API key (e.g., apiKey) to a user identifier and includes a cache of key-value pairs, with a key corresponding to input prompt and a value corresponding to an address of a server including cached tokens pertinent to the prompt.

TABLE 1

```
[ //array of user caches
    { //user cache
        userId: 1,
        apiKey: "0093a-3deX",
        cache: [
            {key: "k1", value: "v1"},
            {key: "k2", value: "v2"},
            {key: "k3", value: "v3"}
        ]
    },
    { ... },
    { ... },
]
```

In some cases, generative response engine 332 may be selected based on previous token activations associated with a previous prompt, saving power and compute time. For example, the tokens are activated at different layers of an ML model (e.g., a transformer model) based on the stream of tokens, and activated tokens can be reused based on a prompt with corresponding tokens.

In some cases, prompt caching can also be shared in a subset of generative response engines, such as generative response engines in a particular data center, a group of generative response engines associated with a hash, etc. In some cases, the prompt and its corresponding tokens can be cached in a database associated with that data center to allow efficient sharing. For example, the database may be an in-memory database (e.g., redis) that caches all prompts within a region of cloud computing service 330 and tokens associated with the prompts. In this case, front end 320 may receive a prompt, identify a matching prompt in the key-value database based on a longest prefix match, and retrieve the tokens corresponding to that matching prompt from a database.

In some aspects, as further described below, front end 320 may also compute a credit to apply to an account based on reuse of tokens stored in the cache. In this way, generative response engine 332 is configured to reduce cost and approve efficiency based on encouraging prompt development to utilize identical prefixes to help guide generative response engine 332 cleanly and efficiently. A longer input prompt provides specific guidance to generative response engine 332 to provide a more specific output that is more relevant, such as how to understand the content after the prefix, how to structure the output, provide constraints, and so forth.

In some aspects, content in body 314 is provided to generative response engine 332 (generate a response. In this example, the prompt is an array of types that includes a single string for illustrative purposes. Generative response engine 332 is configured to convert the text into tokens via a tokenization process that is understandable by generative response engine 332. In some aspects, tokenization breaks down text into smaller units, such as words (e.g., a named entity such as a person's name), subwords, or characters that represent a single concept. The smaller units are provided to an encoder to encode the unit into an input token 340. The input tokens 340 are provided to different layers of the transformer model in generative response engine 332, which then sequentially performs various activation functions to identify relationships to other tokens and the likelihood tokens affect other tokens. As an example, grammatical determiners (e.g., an, a, the) are low value tokens and do not significantly affect other tokens, but gerund verbs have a much higher value because gerund verbs generally have at least two associated nouns (e.g., a subject and an object).

In some aspects, the activation values of input tokens 340 can be cached and reused. For example, the text prompt in HTTP request 310 may include a prefix that is identical to a previous prompt and cached tokens 342 associated with the previous prompt can be reactivated. In this manner, generative response engine 332 can omit at least some of the initial processing of text corresponding to cached tokens 342 by activating cached tokens 342 in generative response engine 332 to resume the transformer model state based on cached tokens 342 and process text after the prefix, such as uncached tokens 344 that follow the cached tokens 342.

Generative response engine 332 is configured to compute output tokens based on the input tokens and may then translate the output tokens into a corresponding output response (e.g., at least one of text, an image, audio, etc.). The conversion of the output tokens could also be handled by other devices, such as a decoder that converts tokens into natural language, images, or audio that is contextually correct. Generative response engine, as part of providing the contextually correct output, may provide information to front end 320 regarding the number of input tokens, the number of output tokens, and the number of cached input tokens. For example, in some aspects, a response provided to client 302 may include an accounting of the number of different tokens.

Front end 320 (or a component thereof) may also include a token counter 326 to count the input and output token based on the type of token. In some aspects, tokens can be computed from or converted into different sources and have different input types, such as text, an image, or audio. Conversion of an image or audio into a token may be more computationally expensive than text, and may have different pricing. In some aspects, generative response engine 332 may output utility objects or types (e.g., partial<Token>) that generative response engine 304 can use to ascertain the resources consumed by generative response engine 332. For example, the generative response engine 304 may use received token information from generative response engine 332 that identifies information sufficient for generative response engine 304 to identify different types of tokens (e.g., input and output tokens). The token information may be explicit (e.g., type: "audio"|"image"|"text") or implicit based on a value within the token.

The generative response engine 304 may be configured to debit an account based on an API query. For example, generative response engine 304 may debit the account associated with the API key based on the number of input and output tokens and based on the type of each token. In some aspects, generative response engine 304 is also configured to automatically discount an API based on the number of cached tokens 342 used in the prompt in body 314. For example, FIG. 3 illustrates four cached input tokens 342 and eight uncached input tokens. In one example, generative response engine 304 may discount cached input tokens 342 by half thereby causing input tokens 340 to have a total value of ten tokens.

In this manner, generative response engine 304 encourages lengthy input prompts that share common features that structure input and output in similar manners to reduce computational load, reuse previous computations, and accelerate generation of responses. In some aspects further described below, an additional layer of caching can also be introduced for encoding multimedia content (e.g., images, audio).

In another aspect, generative response engine 304 is configured to automatically perform caching functions and no additional interaction or options need to be configured in the HTTP request 310 from client 302.

Figure 4:
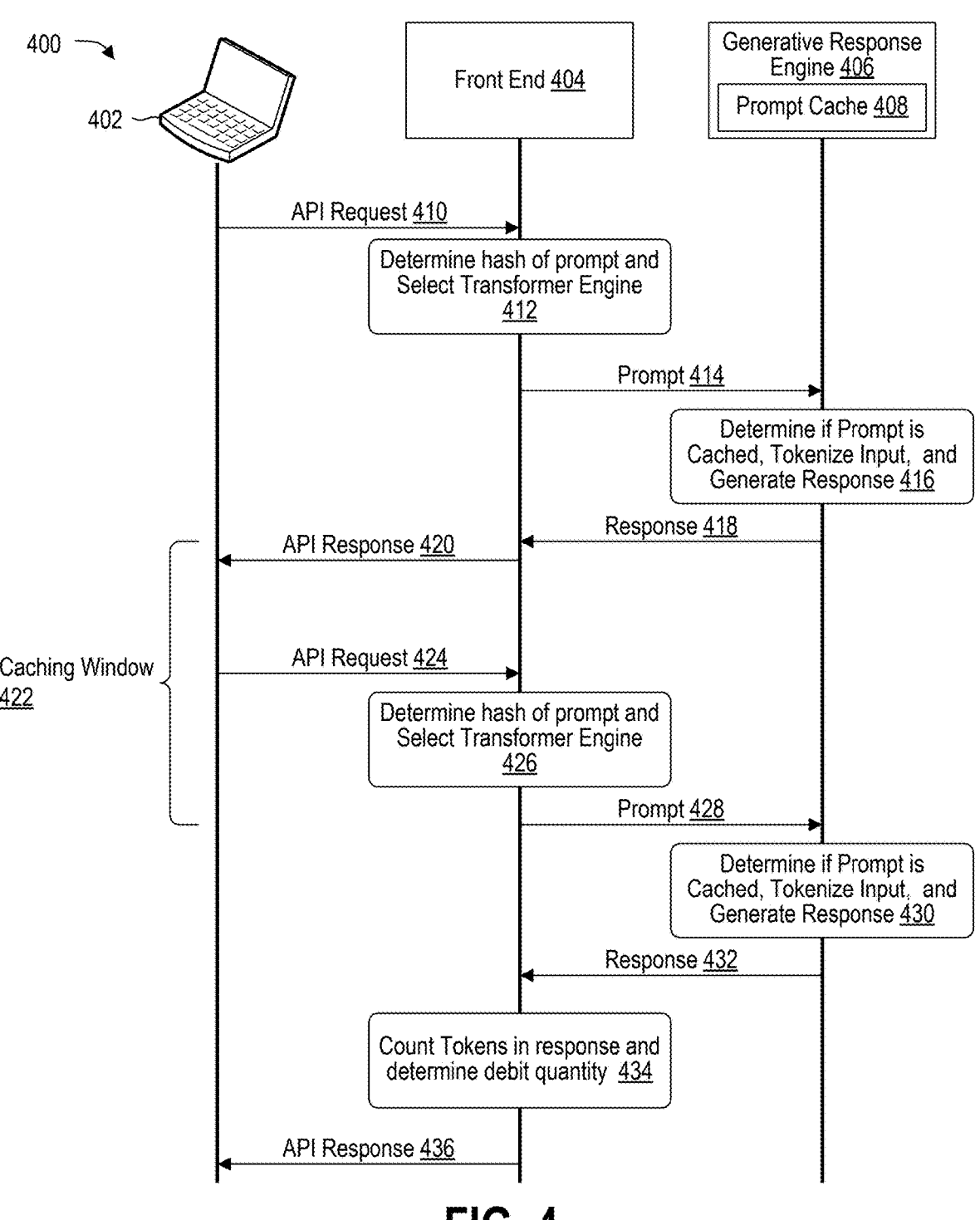
FIG. 4 is a sequence diagram illustrating prompt caching by a generative response engine in accordance with some aspects of the disclosure.

FIG. 4 is a sequence diagram 400 illustrating prompt caching in accordance with some aspects of the disclosure. In some aspects, client 402 is configured to send an API request 410 to a front end 404 of a generative response engine 406 (e.g., generative response engine 110). The generative response engine 406 includes a prompt cache 408 that stores activated tokens using various techniques. For example, the prompt cache 408 may be a key-value pairs that can map unique keys (e.g., a hashed value) to activated tokens. A front end 404 (e.g., front end 102) of generative response engine 406 is configured to receive the request and can perform various operations, such as authentication and authorization based on a header of API request 410.

At block 412, front end 404 (or another component of generative response engine 406) may determine a hash based on the input prompt and may then select a corresponding transformer based on the hash. For example, the first 500 characters of the prompt may be selected and combined with a user specific identifier (e.g., a user identifier) and hashed. Front end 404 is illustrated as performing some operations to simplify illustration of the technical concepts as other components of generative response engine 406 can perform these operations based on different types of architectures. In some cases, at block 412, front end 404 may be able to determine if the prompt is cached (e.g., based on an in-memory database, etc.) and identify a corresponding generative response engine with corresponding cached tokens.

In some cases, if API request 410 activates a deferred response (e.g., within 24 hours), the API request may be redirected to a queue system that activates resources based on data center operation (e.g., load, temperature, etc.). On the other hand, if the API request is determined to require a streaming response (e.g., using a WebSocket connection), the API request may be provided to a data center that is closest to the physical location of client 402 to minimize latency.

In some aspects, front end 404 is configured to provide prompt 414 to generative response engine 406. Prompt 414 can include text and binary data such as images and audio for generative response engine 406 to encode. In the case of binary data, generative response engine 406 may use an encoder to encode the content into tokens for input into generative response engine 406. In some aspects, the prompt 414 can also include the hashed value generated based on the prompt and the user information.

At block 416 generative response engine 406 is configured to determine if a portion of the prompt is cached based on the hash, tokenize the input, and generate a response based on activation of the tokens at different layers of the transformer model of generative response engine 406. For example, the generative response engine 406 may use the hashed value to determine if there are activated tokens in the prompt cache 408. At block 416, the generative response engine 406 does not cache the prompt in the API request 410 and tokenizes the input, and infers a response based on the prompt. In some aspects, generative response engine 406 may also include additional layers, additional procedural logic, and/or additional models to synthesize a contextually aware answer to prompt 414. For example, generative response engine 406 may activate a separate model to validate the output tokens, perform a safety analysis of the output tokens, and other functions to provide a safe and contextually accurate response. Generative response engine 406 provides response 418 to front end 404, which can include transformer compute information for front end 404. Transformer compute information includes information that identifies the amount of computation resources required to generate response 418 such as the number of input tokens, the number of output tokens, and the types of tokens (e.g., an image token, an audio token, a text token, etc.).

Response 418 may also include cache information for front end 404 to store in a cache, such as a key-value pair that identifies the prompt and a value associated with generative response engine 406. Front end 404 may use the cache information to populate a per-user cache store (e.g., prompt cache 336) that identifies the prompt and the identity of generative response engine 406.

Front end 404 may use the transformer compute information to determine an amount to debit a user account based on the number of tokens and the type of the tokens. For example, cached input tokens may reduce an input token debit amount by 50%. In some aspects, front end 404 may also automatically determine a discount to the debit amount based on the number of input tokens. For example, to encourage detailed prompts that can be cached and reduce processing power to compute the input tokens, a minimum of 1024 tokens may be required to activate input caching discounts.

Front end 404 is configured to form API response 420 that includes additional information from response 418, such as a number of input tokens, a number of output tokens, and a number of cached input tokens. API response 420 may also include additional information such as the type of input tokens. Client 402 uses the response in its own application (e.g., e-discovery, chatbot, support center, etc.) and can use the various information (e.g., number of cached input tokens) within API response 420 for metadata handling and analysis purposes.

In some aspects, generative response engine 406 includes caching window 422 that allows client 402 to use a prompt having the same or substantially the same prefix content as prompt 414 to activate the cached input tokens and receive the discounted input token rate. The cached input tokens are specific to generative response engine 406 and cannot be shared and limits the period in which generative response engine 406 can store the cached tokens. For example, generative response engine 406 may including a caching window 322 that generally has a minimum caching duration of 300 seconds (5 minutes) and after the minimum caching duration, there is a higher probability that the cached input tokens may not be available. For example, the cached input tokens become unavailable after an hour.

During caching window 422, client 402 is configured to send an API request 424 to generative response engine 406 including a prompt having a prefix that matches API request 410. For example, API request 410 may include content [X1, X2, X3, and Y], and API request 424 may include content [X1, X2, X3, and Z]

At block 426, front end 404 (or another component of the generative response engine 406) may determine a hash based on the input prompt and may then select a corresponding transformer based on the hash. For example, the first 500 characters of the prompt may be selected and combined with a user specific identifier (e.g., a user identifier) and hashed. In the case that the input prompt includes a binary, the binary can be incorporated into the prompt by for example inserting the byte length into the prompt or a checksum associated with the binary data. In other cases, the binary itself can be ignored. Front end 404 provides a prompt 428 within API request 424 that includes the prompt data and the hashed value.

Generative response engine 406 determines if a portion of the prompt is cached based on the hashed value, tokenize the input, and generate a response based on activation of the tokens at different layers of the transformer model of generative response engine 406 at block 430. For example, the generative response engine 406 may use the hashed value to determine if there are activated tokens in the prompt cache 408 corresponding to the prompt. In the event the generative response engine 406 identifies a cache hit, at block 430, the generative response engine 406 is configured to identify the cached tokens and determine a portion of the prompt to omit tokenization. For example, activate tokens in the prompt cache 408 are provided to a corresponding layer of the transformer model and the remaining tokens associated with the prompt (e.g., the tokens after the portion of the prefix of prompt 428) are generated and fed into the transformer model of generative response engine 406 at block 430 at the corresponding layer, allowing generative response engine 406 to skip tokenization and activation of the tokens [X1, X2, and X3].

In some aspects, the generative response engine 406 may use a longest prefix match to identify the cached tokens. For example, the generative response engine 406 may store key-value pairs with keys corresponding to the prompts. The generative response engine may enumerate the keys (e.g., Object.keys( )) and then iteratively identify a prompt based on a changing length of the prefix. For example, the generative response engine may identify prompts matching the first 128 characters (or tokens) of the prior prompt, and then may successively increase the number of characters until a single prompt is identified. The generative response engine in this case iteratively reduces the potential matches based on a simpler matching criteria. In some cases, the iterative matching process may also attempt to identify a match content based on a length of the prompt, and then successively reduce the content matching. For example, the generative response engine may identify prompts based on 3000 tokens of a 4000 token input prompt, and then successively reduce the number of tokens until a matching prefix is found.

In addition, at block 430, generative response engine 406 may generate output tokens and provide response 432 to front end 404. The cached input tokens reduce computations to process the input to reduce latency based on having generative response engine 406 apply previous computations.

Front end 404 receives the response and, at block 434, is configured to determine the type of each input token, determine the type of each output token, and determine a number of cached input tokens. At block 434, front end 404 also determines an amount of debit to apply to a user's account based on the number of input tokens, the number of output tokens, the number of cached input tokens, and the type of each token. Front end 404 provides an API response 436 including response 432 to client 402, completing API request 424.

Figure 5:
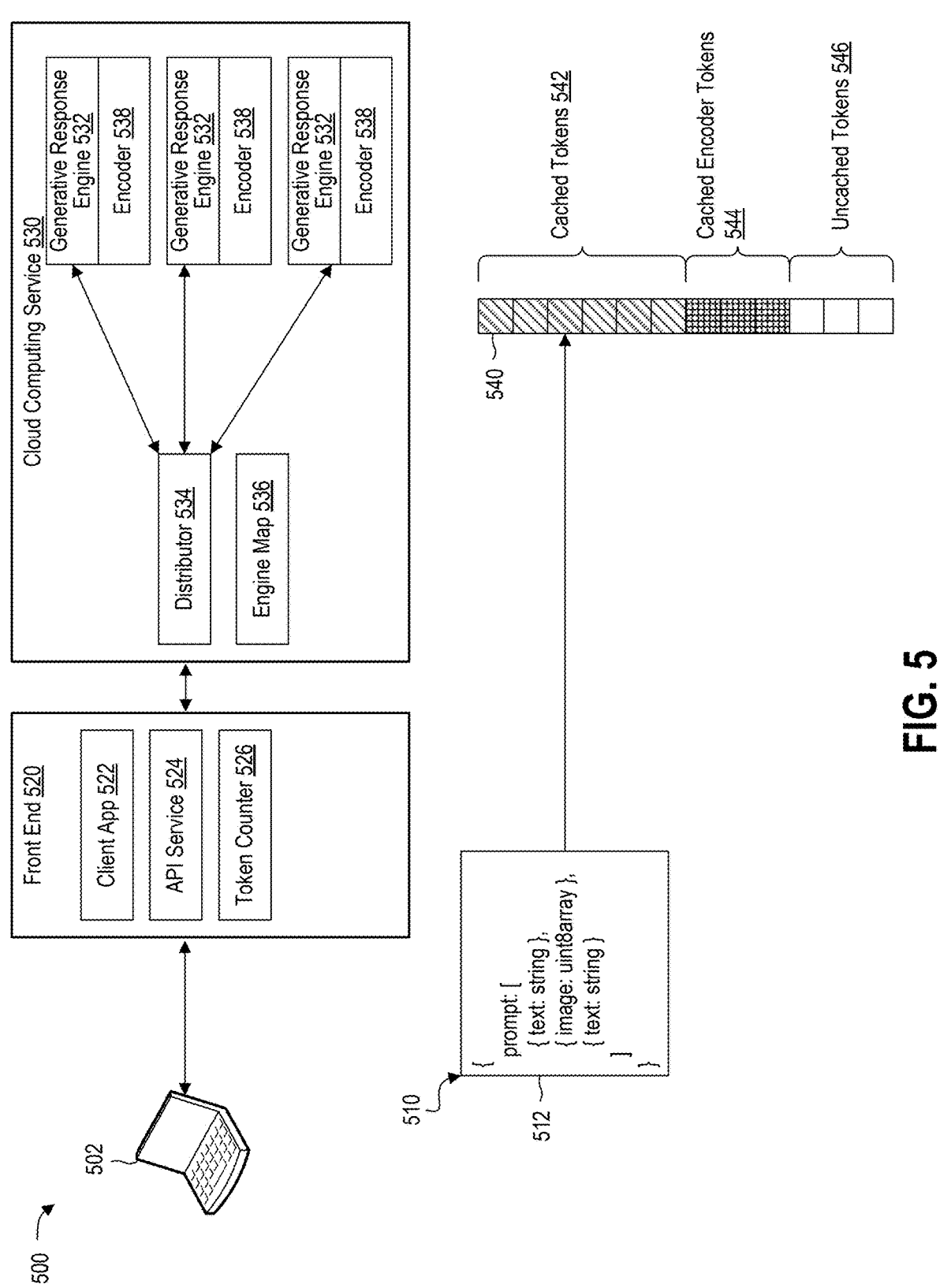
FIG. 5 is a conceptual diagram illustrating caching of input tokens and encoder tokens in accordance with some aspects of the disclosure.

FIG. 5 is a conceptual diagram 500 illustrating caching of multimodal input tokens in accordance with some aspects of the disclosure. In some aspects, client 502 (e.g., client 302)

send a request, such as an HTTP request 510, to front end 520 associated with a service 530. A front end 520 (e.g., front end 102 in FIG. 1) receives HTTP request 510 and performs application layer processing (e.g., authorization, accounting, etc.) and sends payloads within the HTTP request 510 for processing in a cloud computing service 530.

In some aspects, front end 520 includes client application 522 or an API service 524 that can interface with the client 502. For example, client application 522 can use various rendering and hydration techniques such as client-side rendering, server-side rendering, static site generation, etc. The API service 524 (e.g., express, axum, websockets, fresh, etc.) is configured to interface with various types of requests and may be used by the client application 522 or an application local to the client 502 to interface with the service 530.

The cloud computing service 530 includes a distributor 534 (e.g., distributor 334) that is configured to distribute input requests from different clients to generative response engines 532 to balance latency, load, and other parameters. For example, the distributor 534 may generate a hash based on a prefix of the prompt (e.g., the first 500 characters) combined with unique identification information (e.g., the user identifier, the API key of the user, etc.).

In some aspects, each generative response engine 532 may include or be associated with an encoder 538 that encodes binary data (e.g., images, audio, etc.) into input tokens. Generative response engine 532 may also include a prompt cache (e.g., the prompt cache 408, etc.) Generative response engine 532 may also be configured to cache the input tokens associated with the binary data based on different type information. For example, various generative response engines 532 may compute a checksum or other hash that uniquely is associated with binary data within a prompt.

The HTTP request 510 includes body 512 (the header is omitted for brevity) that includes a prompt formed by an array of data. In this aspect, the prompt includes three elements: a string, a byte array (e.g., an unsigned 8-byte integer array or uint8array), and another string. The byte array may be audio, images, or other content that can be processed by the encoder 516 (e.g., a PDF, etc.).

In some aspects, generative response engine 532 and encoder 538 are configured to convert the prompt into tokens. For example, generative response engine 532 and encoder 538 generate input tokens 540. In some aspects, when a second HTTP request is provided that includes a portion of the original prompt and the same byte array (e.g., the same input image or the same input audio, etc.), generative response engine 532 can activate the cache to recall cached tokens 542 and cached encoder tokens 544 based on a previous computation of input tokens, and resume the tokenization and inference operation of the transformer model of generative response engine 532 based on the recall of cached tokens 542, the cached encoder tokens 544, and uncached tokens 546.

In some aspects, cached encoder tokens 544 are not reliant on any text and may be configured at any portion of the input prompt. For example, even if the second HTTP request did not include prompt text corresponding to recall cached tokens 542, distributor 534 may select generative response engine 532 based on cached encoder tokens 544.

FIG. 6A is a flow diagram of a process 600 for caching input prompts in accordance with some aspects of the disclosure. In some aspects, process 600 can be performed by a computing device (or apparatus) or a component (e.g., one or more chipsets, a system-on-chip (SoC), one or more processors such as one or more central processing units (CPUs), graphics processing units (GPUs), digital signal processors (DSPs), neural processing units (NPUs), neural signal processors (NSPs), microcontrollers, ASICs, FPGAs, programmable logic devices, discrete gates or transistor logic components, discrete hardware components, etc., an ML system such as a neural network model, any combination thereof, and/or other component or system) of the computing device. The operations of process 600 may be implemented as software components that are executed and run on one or more processors (e.g., CPU, GPU, DSP, NPU or neural engine, SoC, the processor 904 of FIG. 9, and/or other processor(s)).

In some aspect, the computing system may receive an initial prompt and determine a whether the initial prompt is associated with a prior prompt based on the cache. When a second prompt is not associated with a prior prompt based on the cache associated with the account corresponding to the access key, the computing system may compute a hash based on the second prompt (e.g., a prefix of the prompt). The computing system then identifies the generative response engine corresponding to the hash to randomly distribute the initial prompt.

In some aspects, the computing system may receive a response associated with the initial prompt and store a key corresponding to an initial prompt and a value corresponding to the generative response engine. In some cases, the key may be stored when the number of input tokens exceeds a threshold number of input (e.g., 1024). The generative response engine may provide a response with a number of tokens, and the computing system can determine a key-value pair to store that maps the prompt to the generative response engine (e.g., on a per user basis).

At block 602, the computing device may receive a request including a first prompt including a natural language task for a generative response engine to perform. The request may include an access key for accessing the generative response engine and can be mapped to an account to apply debit based on use of the generative response engine. In some aspects, the first prompt and the second prompt can include multimodal content, such as text, images, and audio.

The first prompt (or any other prompt including the initial prompt) may include at least text input (e.g., a text string). Prompts can also include binary data such as images and audio that can be converted into vector representations.

At block 604, the computing device may generate a hash based on the first prompt. For example, the first 500 characters of the prompt can be combined with unique information that identifies a source of the request (e.g., the API key, etc.).

At block 606, the computing device may identify a generative response engine corresponding to the hash. The hash (e.g., the hashed value) can be mapped to a first generative response engine. The hash may also be mapped to a group of generative response engines based on if, for example, the first generative response engine is busy with another request.

At block 608, the computing device may forward the first prompt to the generative response engine. In some cases, the computing device (or another component thereof) may tokenize the prompt and can include the tokens along with the first prompt. In some aspects, the computing device, at block 608, may also include the hash along with the first prompt to the generative response engine. For example, the generative response engine may store the hash to identify prompts associated with customer. For example, the generative response engine can store the hash as a key in a key-tuple. In other examples, the generative response engine can store the hash in a tuple of [hash, prompt, activated tokens] to allow the hash to perform identification of prior hashes and prompts. In other cases, the hash may be omitted.

At block 610, the computing device may receive a response from the generative response engine responsive to the first prompt. In some aspects, the response includes a number of input tokens, the output tokens, and a number of cached input tokens that were activated by the generative response engine. In one aspect, the response can include information that the computing device can replay the input prompt to determine the types of each token, the number of cached input tokens, the number of uncached input tokens, and the number of output tokens. For example, the computing device may determine a first number of input tokens corresponding to a first type and determining a second number of input tokens corresponding to a second type. Each output token may be include explicit information that identifies the type token or implicit information that identifies the type of token. A non-limiting example of implicit information includes different logical values (e.g., unsigned float values 0.0-0.89 correspond to text, unsigned float values 0.90-0.97 correspond to images, and unsigned float values 0.98-0.99 correspond to audio). The types of tokens include at least one of text, images, or audio. The computing device may determine a discount based on the first number of input tokens, a first credit associated with the first type, the second number of input tokens, and a second credit associated with the second type.

In some aspects, the generative response engine may replay the input tokens to identify the types of tokens similar to block 610. In this aspect, the generative response engine provides the token count information to the computing device.

At block 612, the computing device may determine a credit to apply to the account associated with the first prompt based on the number of input tokens. For example, the cached input tokens discount input token by 50%. For example, if 2048 tokens are cached in a prompt input, the user account is debited based on 1024 tokens.

In some aspects, the computing device can also determine whether a second portion of the first prompt comprising binary data was encoded by an encoder. Non-limiting examples of binary data include images and audio, but may include documents (e.g., PDF documents), video, and so forth. Based on the presence of binary data, the computing device is configured to generate and inserting information corresponding to the second portion of the first prompt into the first prompt. For example, when the computing device determines that a binary data was previously used by an encoder of a transform engine, the computing device may insert data into the prompt in lieu of the binary data. For example, the inserted data may be a checksum or a hash of the binary data, which allows the encoder to recall the tokens or allows the generative response engine to activate tokens that are currently cached. When the data is cached, the computing system generates and inserts information corresponding to the second portion of the first prompt into the first prompt.

The computing device may determine another credit to apply to the account associated with the first prompt based on a number of input tokens associated with the second portion. For example, the generative response engine (and encoder) do not need to reencode the binary data since it is cached, improving latency by reducing computations and power consumption.

FIG. 6B is a flow diagram of a process 650 for caching input prompts in accordance with some aspects of the disclosure. In some aspects, process 650 can be performed by a computing device (or apparatus) or a component of the computing device.

At block 652, the computing device may receive a request including a first prompt including a natural language task for a generative response engine to perform (e.g., similar to block 602).

At block 654, the computing device may tokenize the natural language task in the response or cause another component (e.g., a hardware accelerator such as a functional programmable gate array (FPGA), etc.) to tokenize the natural language task.

At block 656, the computing device may compute a hash based on a prefix of the tokens. In some aspects, the computing device can also include unique information that identifies a user or an account of the user (e.g., user identifier, API key of the user, etc.) in the hash.

At block 658, the computing device may identify a generative response engine corresponding to the hash. In some aspects, the computing device may determine if the generative response engine is able to handle the natural language task based on its current workload (e.g., a queue of natural language tasks). If the generative response engine is unable to handle the natural language task, the computing device may identify a group of generative response engines corresponding to the hash, and select a different generative response engine.

At block 660, the computing device may forward the tokens and the hash to the generative response engine. In some aspects, the generative response engine may use the hash to determine if there are activated tokens corresponding to the hash that are currently cached in the generative response engine and can be used. In the case there is a cache hit, the generative response engine retrieves and the activated tokens and determines tokens from the computing device that can be discarded. The generative response engine in this case is able to bypass some of the initial token activation processes in the model based on the prefix of the prompt being the same.

At block 662, the computing device may receive a response from the generative response engine responsive to the first prompt. In some aspects, the response includes a number of input tokens, the output tokens, and a number of cached input tokens that were activated by the generative response engine. In one aspect, the response can include information that the computing device can replay the input prompt to determine the types of each token, the number of cached input tokens, the number of uncached input tokens, and the number of output tokens. For example, the computing device may determine a first number of input tokens corresponding to a first type and determining a second number of input tokens corresponding to a second type. Each output token may be include explicit information that identifies the type token or implicit information that identifies the type of token. A non-limiting example of implicit information includes different logical values (e.g., unsigned float values 0.0-0.89 correspond to text, unsigned float values 0.90-0.97 correspond to images, and unsigned float values 0.98-0.99 correspond to audio). The types of tokens include at least one of text, images, or audio. The computing device may determine a discount based on the first number of input tokens, a first credit associated with the first type, the second number of input tokens, and a second credit associated with the second type.

At block 664, the computing device may determine a credit to apply to the account associated with the first prompt based on the number of input tokens. For example, the cached input tokens discount input token by 50%. For example, if 2048 tokens are cached in a prompt input, the user account is debited based on 1024 tokens.

FIG. 6B is a flow diagram of a process 650 for caching input prompts in accordance with some aspects of the disclosure. In some aspects, process 650 can be performed by a computing device (or apparatus) or a component of the computing device.

At block 652, the computing device may receive a request including a first prompt including a natural language task for a generative response engine to perform (e.g., similar to block 602).

At block 654, the computing device may tokenize the natural language task in the response or cause another component (e.g., a hardware accelerator such as a functional programmable gate array (FPGA), etc.) to tokenize the natural language task.

In some cases, the caching input prompts may be based on a centralized repository in accordance with some aspects of the disclosure. For example, a generative response engine may forward a key-value pair to a cache within a data center. The key may represent searchable information, such as a prefix of a prompt or a hash of the prefix, and the value may include a portion of activated tokens. When a generative response engine receives within that data center, the generative response engine may generate a key based on the prompt to identify if there is corresponding activated tokens in the cache. For example, the cache can be implemented using an in-memory database (e.g., redis).

In this example, the prompt may include specific information, such as a flag to identify that the prompt should be cached. Attempting to cache every request would be too expensive and an explicit request to cache is necessary to reduce network bandwidth usage within the data center. The centralized cache technique is slightly different because it allows the sharing of activated tokens across different generative response engines. In the process 600 and the process 650, the caching of the input prompt is automatic based on the hash, does not require explicit instructions, and does not require any developer changes (e.g., a request to cache the prompt in an API request). The caching of the input prompt at the centralized cache also adds additional latency based on additional requests, searching, and transmission of the activated tokens.

Figure 7:
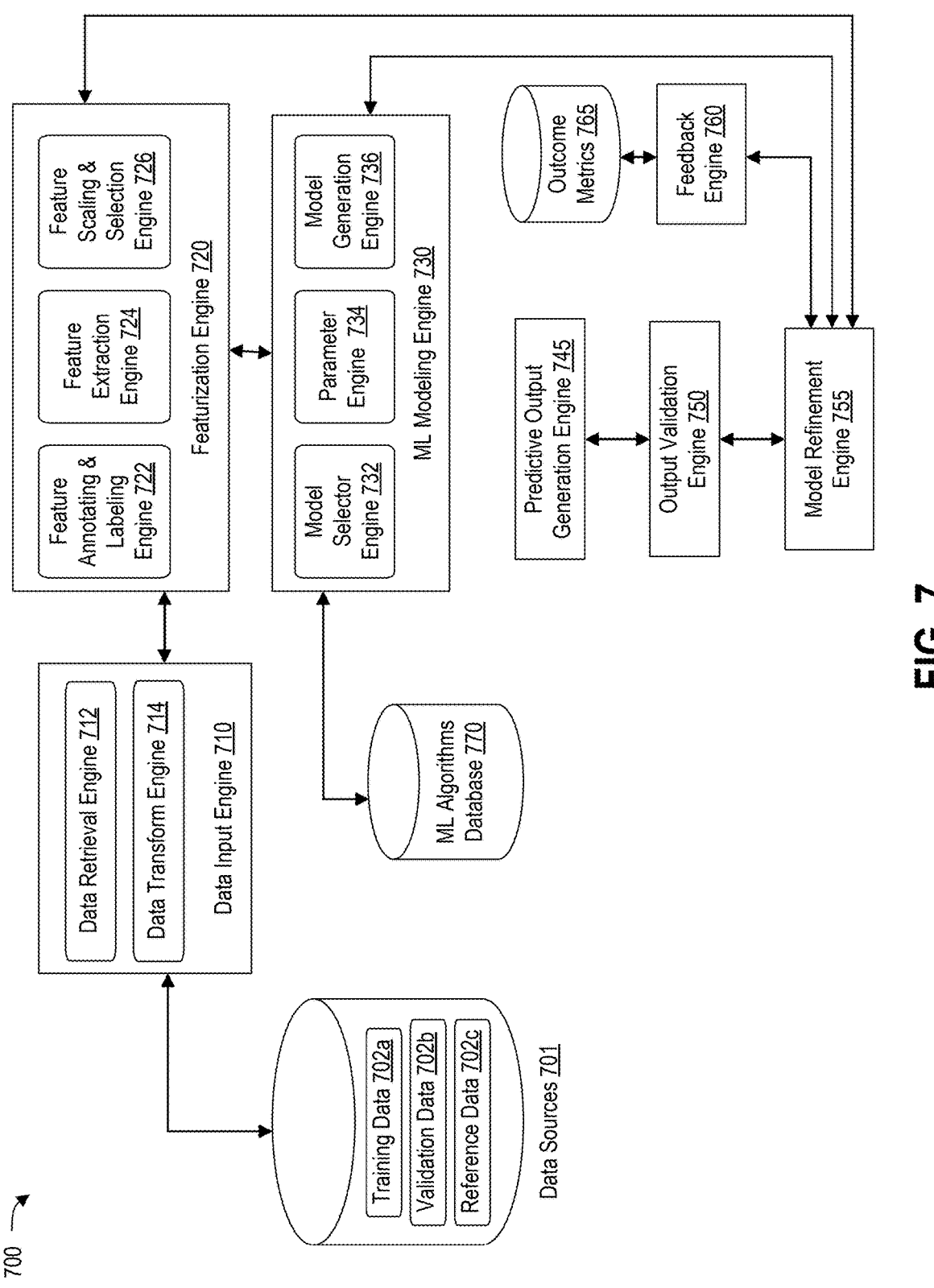
FIG. 7 is a block diagram illustrating an example machine learning platform for implementing various aspects of this disclosure in accordance with some aspects of the present technology.

FIG. 7 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 700 may include data input engine 710 that can further include data retrieval engine 712 and data transform engine 714. Data retrieval engine 712 may be configured to access, interpret, request, or receive data, which may be adjusted, reformatted, or changed (e.g., to be interpretable by another engine, such as data input engine 710). For example, data retrieval engine 712 may request data from a remote source using an API. Data input engine 710 may be configured to access, interpret, request, format, re-format, or receive input data from data sources(s) 701. For example, data input engine 710 may be configured to use data transform engine 714 to execute a re-configuration or other change to data, such as a data dimension reduction. In some embodiments, data sources(s) 701 may be associated with a single entity (e.g., organization) or with multiple entities. Data sources(s) 701 may include one or more of training data 702a (e.g., input data to feed a machine learning model as part of one or more training processes), validation data 702b (e.g., data against which at least one processor may compare model output with, such as to determine model output quality), and/or reference data 702c. In some embodiments, data input engine 710 can be implemented using at least one computing device. For example, data from data sources(s) 701 can be obtained through one or more I/O devices and/or network interfaces. Further, the data may be stored (e.g., during execution of one or more operations) in a suitable storage or system memory. Data input engine 710 may also be configured to interact with a data storage, which may be implemented on a computing device that stores data in storage or system memory.

System 700 may include featurization engine 720. Featurization engine 720 may include feature annotating and labeling engine 722 (e.g., configured to annotate or label features from a model or data, which may be extracted by feature extraction engine 724), feature extraction engine 724 (e.g., configured to extract one or more features from a model or data), and/or feature scaling and selection engine 726. Feature scaling and selection engine 726 may be configured to determine, select, limit, constrain, concatenate, or define features (e.g., AI features) for use with AI models.

System 700 may also include machine learning (ML) ML modeling engine 730, which may be configured to execute one or more operations on a machine learning model (e.g., model training, model re-configuration, model validation, model testing), such as those described in the processes described herein. For example, ML modeling engine 730 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 702a) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 730 may include model selector engine 732 (e.g., configured to select a model from among a plurality of models, such as based on input data), parameter engine 734 (e.g., configured to add, remove, and/or change one or more parameters of a model), and/or model generation engine 736 (e.g., configured to generate one or more machine learning models, such as according to model input data, model output data, comparison data, and/or validation data).

In some embodiments, model selector engine 732 may be configured to receive input and/or transmit output to ML algorithms database 770. Similarly, featurization engine 720 can utilize storage or system memory for storing data and can utilize one or more I/O devices or network interfaces for transmitting or receiving data. ML algorithms database 770 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 770 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 770 include versions DALL-E, CHAT GPT, and SORA, all provided by OPEN AI.

System 700 can further include predictive output generation engine 745 and output validation engine 750 (e.g., configured to apply validation data to machine learning model output). Predictive output generation engine 745 can analyze the input and identify relevant patterns and associations in the data it has learned to generate a sequence of words that predictive output generation engine 745 predicts is the most likely continuation of the input using one or more models from the ML algorithms database 770, aiming to provide a coherent and contextually relevant answer. Predictive output generation engine 745 generates responses by sampling from the probability distribution of possible words and sequences, guided by the patterns observed during its training. In some embodiments, predictive output generation engine 745 can generate multiple possible responses before presenting the final one. Predictive output generation engine 745 can generate multiple responses based on the input, and these responses are variations that predictive output generation engine 745 considers potentially relevant and coherent. Output validation engine 750 can evaluate these generated responses based on certain criteria. These criteria can include relevance to the prompt, coherence, fluency, and sometimes adherence to specific guidelines or rules, depending on the application. Based on this evaluation, output validation engine 750 selects the most appropriate response.

This selection is typically the one that scores highest on the set criteria, balancing factors like relevance, informativeness, and coherence.

System 700 can further include feedback engine 760 (e.g., configured to apply feedback from a user and/or machine to a model) and model refinement engine 755 (e.g., configured to update or re-configure a model). In some embodiments, feedback engine 760 may receive input and/or transmit output (e.g., output from a trained, partially trained, or untrained model) to outcome metrics database 765. Outcome metrics database 765 may be configured to store output from one or more models and may also be configured to associate output with one or more models. In some embodiments, outcome metrics database 765, or other device (e.g., model refinement engine 755 or feedback engine 760), may be configured to correlate output, detect trends in output data, and/or infer a change to input or model parameters to cause a particular model output or type of model output. In some embodiments, model refinement engine 755 may receive output from predictive output generation engine 745 or output validation engine 750. In some embodiments, model refinement engine 755 may transmit the received output to featurization engine 720 or ML modeling engine 730 in one or more iterative cycles.

The engines of system 700 may be packaged functional hardware units designed for use with other components or a part of a program that performs a particular function (e.g., of related functions). Any or each of these modules may be implemented using a computing device. In some embodiments, the functionality of system 700 may be split across multiple computing devices to allow for distributed processing of the data, which may improve output speed and reduce computational load on individual devices. In some embodiments, system 700 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 700 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 8A:
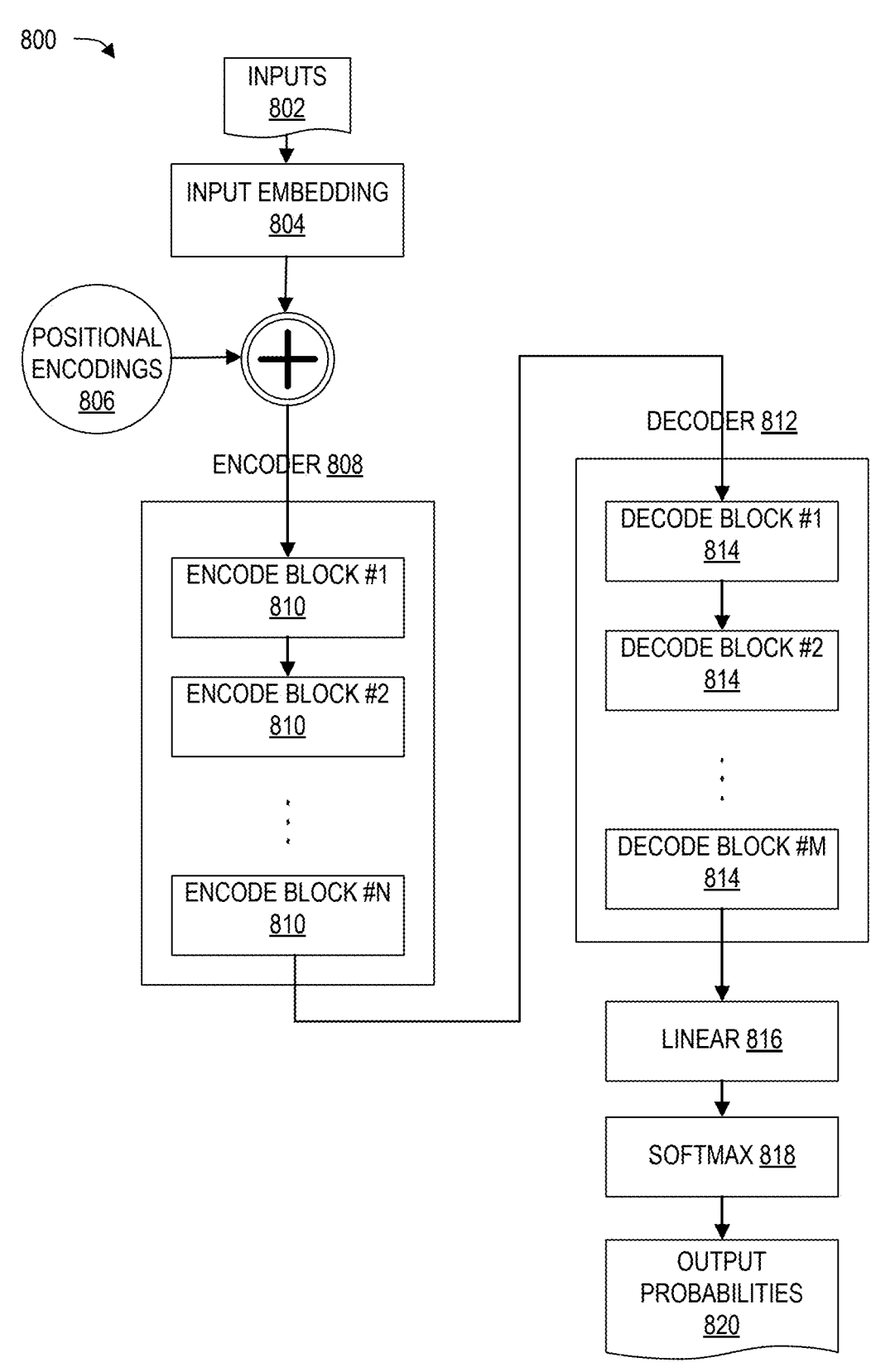
FIG. 8A, FIG. 8B, and FIG. 8C illustrates an example transformer architecture in accordance with some embodiments of the present technology.
Figure 8B:
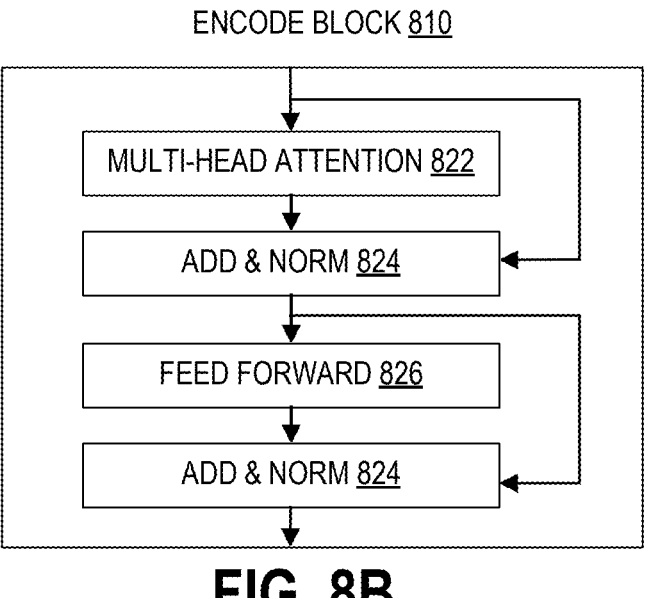
Figure 8C:
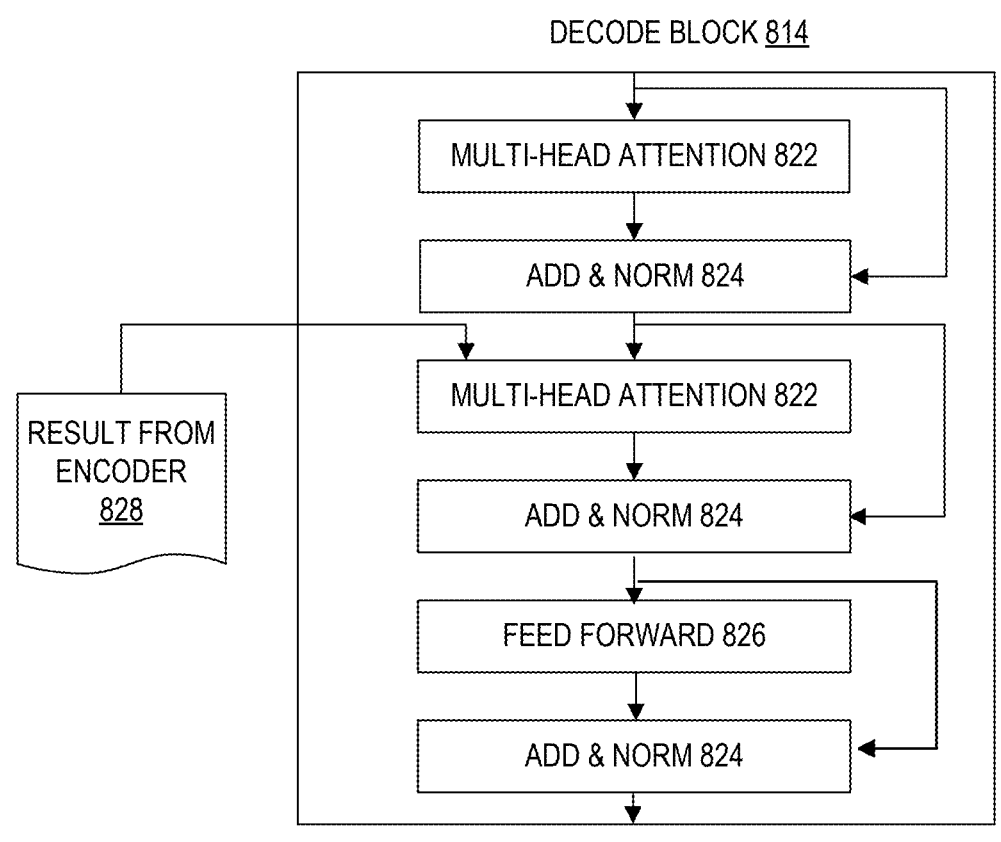

FIG. 8A, FIG. 8B, and FIG. 8C illustrates an example transformer architecture in accordance with some embodiments of the present technology. Examples of ML models that use a transformer neural network (e.g., transformer architecture 800) can include, e.g., generative pretrained transformer (GPT) models and Bidirectional Encoder Representations from Transformer (BERT) models. The transformer architecture 800, which is illustrated in FIG. 8A, FIG. 8B, and FIG. 8C, includes inputs 802, input embedding block 804, positional encodings 806, encoder 808 including encode blocks 810, decoder 812 including decode blocks 814, linear block 816, softmax block 818, and output probabilities 820.

Input embedding block 804 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 804 can be learned embeddings to convert the input tokens and output tokens to vectors of dimension that have the same dimension as the positional encodings, for example.

Positional encodings 806 provide information about the relative or absolute position of the tokens in the sequence. According to certain non-limiting examples, positional encodings 806 can be provided by adding positional encodings to the input embeddings at the inputs to the encoder 808 and decoder 812. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 808 can use stacked self-attention and pointwise, fully connected layers. Encoder 808 can be a stack of N identical layers (e.g., N=6), and each layer can be an encode block, as illustrated by encode block 810 shown in FIG. 8B. Each encode block 810 has two sub-layers: (i) a first sub-layer has a multi-head attention block 822 and (ii) a second sub-layer has a feed forward block 826, which can be a position-wise fully connected feed-forward network. The feed forward block 826 can use a rectified linear unit (ReLU).

Encoder 808 uses a residual connection around each of the two sub-layers, followed by an add and norm block 824, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 808, decoder 812 uses stacked self-attention and point-wise, fully connected layers. Decoder 812 can also be a stack of M identical layers (e.g., M=6), and each layer can be a decode block, as illustrated by decode block 812 shown in FIG. 8B. In addition to the two sub-layers (i.e., the sublayer with multi-head attention block 822 and the sub-layer with feed forward block 826) found in encode block 810, decode block 814 can include a third sub-layer, which performs multi-head attention over the output of the encoder stack. Similar to encoder 808, decoder 812 uses residual connections around each of the sub-layers, followed by layer normalization. Additionally, the sub-layer with multi-head attention block 822 can be modified in the decoder stack to prevent positions from attending to subsequent positions. This masking, combined with the fact that the output embeddings are offset by one position, can ensure that the predictions for position i can depend only on the known output data at positions less than i.

Linear block 816 can be a learned linear transformation. For example, when transformer architecture 800 is being used to translate from a first language into a second language, linear block 816 can project the output from the last decode softmax block 818 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 818 then turns the scores from linear block 816 into output probabilities 820 (which add up to 1.0). In each position, the index provides for the word with the highest probability, and then maps that index to the corresponding word in the vocabulary. Those words then form the output sequence of transformer architecture 800. The softmax operation is applied to the output from linear block 816 to convert the raw numbers into output probabilities 820 (e.g., token probabilities).

Figure 9:
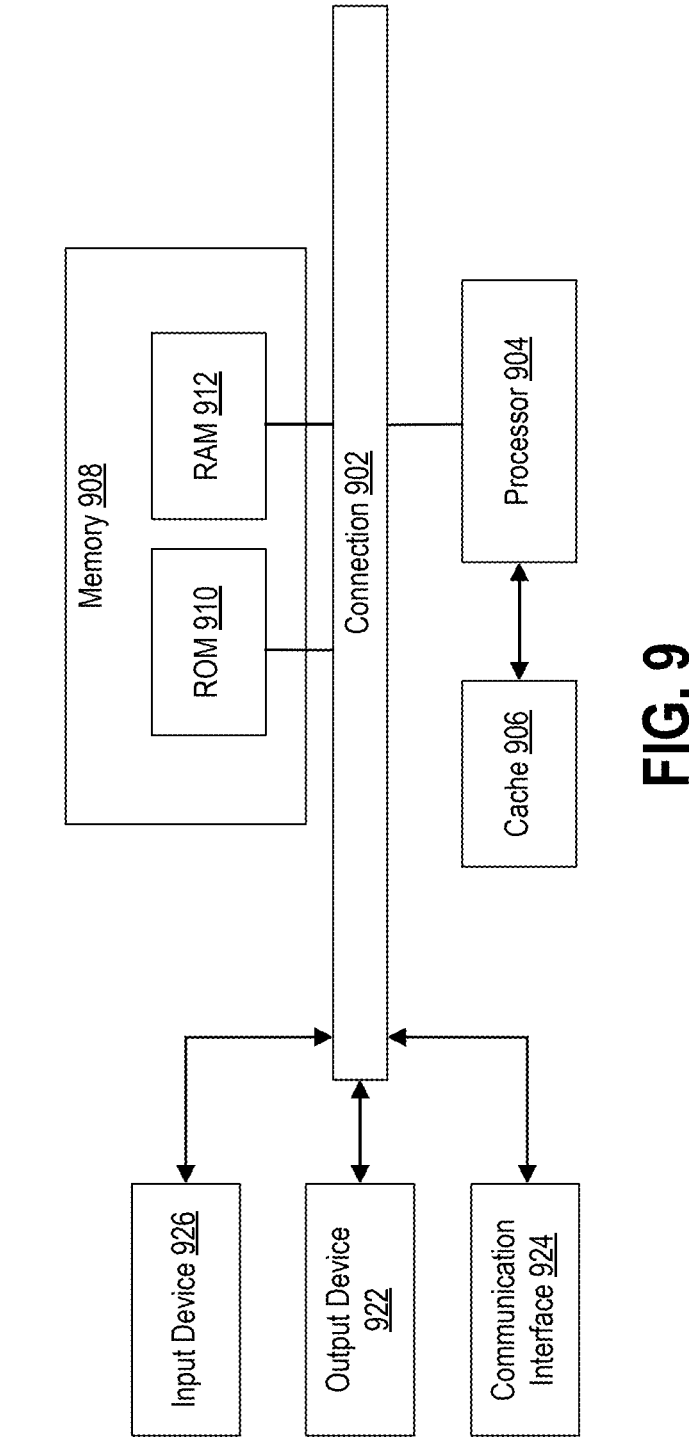
FIG. 9 shows an example of computing system that can implement various aspects of the present technology and any engine illustrated in FIG. 1 or any component thereof.

FIG. 9 shows an example of computing system 900, which can be, for example, any computing device making up any engine illustrated in FIG. 1 or any component thereof.

In some embodiments, computing system 900 is a single device, or a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

In some embodiments, computing system 900 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 900 includes at least one processing unit (CPU or processor) 904 and connection 902 that couples various system components including system memory 908, such as read-only memory (ROM) 910 and random access memory (RAM) 912 to processor 904. Memory 908 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 908 can include software services, servers, logic, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

Computing system 900 can include a cache of high-speed memory 906 connected directly with, in close proximity to, or integrated as part of processor 904.

Connection 902 can be a physical connection via a bus, or a direct connection into processor 904, such as in a chipset architecture. Connection 902 can also be a virtual connection, networked connection, or logical connection.

Processor 904 can include any general purpose processor and a hardware service or software service stored in memory 908, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric. Processor 904 can be physical or virtual.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

In some embodiments, computing system 900 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Aspect 1. A method, comprising: receiving, by a cloud computing service, a request including a first prompt including a natural language task to perform, wherein the request include an access key for accessing the cloud computing service; identifying a generative response engine for generating a response to the natural language task based on contents of the natural language task; transmitting the first prompt and a hash to the generative response engine; and receiving the response to the natural language task from the generative response engine, the response including a number of input tokens.

Aspect 2. The method of Aspect 1, further comprising: generating the hash based on combination of a portion of the first prompt and distinct information.

Aspect 3. The method of Aspect 2, wherein the distinct information comprises at least one of a user identifier, an API key, or a user generated secret.

Aspect 4. The method of any of Aspects 2 to 3, wherein the portion of the first prompt comprises a prefix of the first prompt.

Aspect 5. The method of any of Aspects 1 to 4, wherein the generative response engine is configured to identify a second prompt corresponding with the first prompt using the hash, and wherein the generative response engine determines if activated tokens associated with the second prompt can be loaded for inference of the first prompt.

Aspect 6. The method of any of Aspects 1 to 5, wherein the first prompt comprises text and binary data.

Aspect 7. The method of any of Aspects 1 to 6, further comprising: determining a first number of input tokens corresponding to a first type, wherein the first type includes one of text, images, or audio; determining a second number of input tokens corresponding to a second type different from the first type; and determining a discount based on the first number of input tokens, a first credit associated with the first type, the second number of input tokens, and a second debit associated with the second type.

Aspect 8. The method of any of Aspects 1 to 7, further comprising: determining a second portion of the first prompt comprising binary data was encoded by an encoder; and generating and inserting information corresponding to the second portion of the first prompt into the first prompt.

Aspect 9. The method of Aspect 8, wherein the information corresponding to the second portion of the first prompt comprises a checksum or a hash of the second portion.

Aspect 10. The method of any of Aspects 8 to 9, further comprising: determining another credit to apply to an account associated with the an API key in the first prompt based on a number of input tokens associated with the second portion.

Aspect 11. The method of any of Aspects 1 to 10, further comprising: determining a first debit to apply to an account associated with an API key in the first prompt based on the number of input tokens and a number of output tokens of the response.

Aspect 11. A computing device for caching prompts for a generative response engine. The computing device includes at least one memory and at least one processor coupled to the at least one memory and configured to: receive a request including a first prompt including a natural language task to perform, wherein the request include an access key for accessing the cloud computing service; identify a generative response engine for generating a response to the natural language task based on contents of the natural language task; transmit the first prompt and a hash to the generative response engine; and receive the response to the natural language task from the generative response engine, the response including a number of input tokens.

Aspect 12. The computing device of Aspect 11, wherein the at least one processor is configured to: generate the hash based on combination of a portion of the first prompt and distinct information.

Aspect 13. The computing device of Aspect 12, wherein the distinct information comprises at least one of a user identifier, an API key, or a user generated secret.

Aspect 14. The computing device of any of Aspects 12 to 13, wherein the portion of the first prompt comprises a prefix of the first prompt.

Aspect 15. The computing device of any of Aspects 11 to 14, wherein the generative response engine is configured to identify a second prompt corresponding with the first prompt using the hash, and determine if activated tokens associated with the second prompt can be loaded for inference of the first prompt.

Aspect 16. The computing device of any of Aspects 11 to 15, wherein the first prompt comprises text and binary data.

Aspect 17. The computing device of any of Aspects 11 to 16, wherein the at least one processor is configured to: determine a first number of input tokens corresponding to a first type, wherein the first type includes one of text, images, or audio; determine a second number of input tokens corresponding to a second type different from the first type; and determine a discount based on the first number of input tokens, a first credit associated with the first type, the second number of input tokens, and a second debit associated with the second type.

Aspect 18. The computing device of any of Aspects 11 to 17, wherein the at least one processor is configured to: determine a second portion of the first prompt comprising binary data was encoded by an encoder; and generate and inserting information corresponding to the second portion of the first prompt into the first prompt.

Aspect 19. The computing device of Aspect 18, wherein the information corresponding to the second portion of the first prompt comprises a checksum or a hash of the second portion.

Aspect 20. The computing device of any of Aspects 18 to 19, wherein the at least one processor is configured to: determine another credit to apply to an account associated with the an API key in the first prompt based on a number of input tokens associated with the second portion.

Aspect 21. The computing device of any of Aspects 11 to 20, wherein the at least one processor is configured to: determine a first debit to apply to an account associated with an API key in the first prompt based on the number of input tokens and a number of output tokens of the response.

Aspect 22. The computing device of any of Aspects 11 to 21, wherein the at least one processor is configured to: determine a first debit to apply to an account associated with an API key in the first prompt based on the number of input tokens and a number of output tokens of the response.

Aspect 23. A non-transitory computer-readable medium having stored thereon instructions that, when executed by at least one processor, cause the at least one processor to perform operations according to any of Aspects 1 to 11.

Aspect 24. An apparatus for caching prompts for a generative response engine, comprising one or more means for performing operations according to any of Aspects 1 to 11.

What is claimed is:

1. A method, comprising:
receiving, by a cloud computing service, a request including a first prompt including a natural language task to perform, wherein the request includes an access key for accessing the cloud computing service;
identifying a generative response engine for generating a response to the natural language task based on contents of the natural language task;
transmitting the first prompt to the generative response engine; and
receiving the response to the natural language task from the generative response engine, the response including a number of input tokens,
wherein the generative response engine is configured to identify a second prompt corresponding with the first prompt using a hash, and wherein the generative response engine determines if activated tokens associated with the second prompt can be loaded for inference of the first prompt.

2. The method of claim 1, further comprising:
generating the hash based on combination of a portion of the first prompt and distinct information, wherein the hash identifies the generative response engine.

3. The method of claim 2, wherein the distinct information comprises at least one of a user identifier, an API key, or a user generated secret.

4. The method of claim 2, wherein the portion of the first prompt comprises a prefix of the first prompt.

5. The method of claim 1, wherein the first prompt comprises text and binary data.

6. The method of claim 1, further comprising:
determining a first number of input tokens corresponding to a first type, wherein the first type includes one of text, images, or audio;
determining a second number of input tokens corresponding to a second type different from the first type; and
determining a discount based on the first number of input tokens, a first credit associated with the first type, the second number of input tokens, and a second debit associated with the second type.

7. The method of claim 1, further comprising:
determining a second portion of the first prompt comprising binary data was encoded by an encoder; and
generating and inserting information corresponding to the second portion of the first prompt into the first prompt.

8. The method of claim 7, wherein the information corresponding to the second portion of the first prompt comprises a checksum or a hash of the second portion.

9. The method of claim 7, further comprising:
determining another credit to apply to an account associated with an API key in the first prompt based on a number of input tokens associated with the second portion.

10. The method of claim 1, further comprising:
determining a first debit to apply to an account associated with an API key in the first prompt based on the number of input tokens and a number of output tokens of the response.

11. A computing device for caching prompts for a generative response engine, comprising:
at least one memory; and
at least one processor coupled to the at least one memory and configured to:
receive, by the computing device, a request including a first prompt including a natural language task to perform, wherein the request include an access key for accessing a cloud computing service;
identify a generative response engine for generating a response to the natural language task based on contents of the natural language task;
transmit the first prompt and a hash to the generative response engine; and
receive the response to the natural language task from the generative response engine, the response including a number of input tokens,
wherein the generative response engine is configured to identify a second prompt corresponding with the first prompt using the hash, and wherein the generative response engine determines if activated tokens associated with the second prompt can be loaded for inference of the first prompt.

12. The computing device of claim 11, wherein the at least one processor is configured to:
generate the hash based on combination of a portion of the first prompt and distinct information.

13. The computing device of claim 12, wherein the distinct information comprises at least one of a user identifier, an API key, or a user generated secret.

14. The computing device of claim 12, wherein the portion of the first prompt comprises a prefix of the first prompt.

15. The computing device of claim 11, wherein the first prompt comprises text and binary data.

16. The computing device of claim 11, wherein the at least one processor is configured to:
determine a first number of input tokens corresponding to a first type, wherein the first type includes one of text, images, or audio;
determine a second number of input tokens corresponding to a second type different from the first type; and
determine a discount based on the first number of input tokens, a first credit associated with the first type, the second number of input tokens, and a second debit associated with the second type.

17. The computing device of claim 11, wherein the at least one processor is configured to:

determine a second portion of the first prompt comprising binary data was encoded by an encoder; and generate and inserting information corresponding to the second portion of the first prompt into the first prompt.

18. The computing device of claim 17, wherein the information corresponding to the second portion of the first prompt comprises a checksum or a hash of the second portion.

19. The computing device of claim 17, wherein the at least one processor is configured to:

determine another credit to apply to an account associated with the access key in the first prompt based on a number of input tokens associated with the second portion.

20. The computing device of claim 11, wherein the at least one processor is configured to:

determine a first debit to apply to an account associated with an API key in the first prompt based on the number of input tokens and a number of output tokens of the response.

* * * * *